United States Patent
Nakaya et al.

(10) Patent No.: US 7,126,624 B2
(45) Date of Patent: Oct. 24, 2006

(54) IMAGE RECORDING METHOD AND IMAGE RECORDING APPARATUS

(75) Inventors: Daisuke Nakaya, Kanagawa (JP); Koji Wada, Kanagawa (JP); Katsuto Sumi, Kanagawa (JP); Hiroshi Sunagawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 924 days.

(21) Appl. No.: 10/188,365

(22) Filed: Jul. 3, 2002

(65) Prior Publication Data

US 2003/0021493 A1   Jan. 30, 2003

(30) Foreign Application Priority Data

Jul. 4, 2001   (JP) .............................. 2001-203707

(51) Int. Cl.
    *B41J 2/47* (2006.01)
(52) U.S. Cl. ........................................ 347/239; 347/255
(58) Field of Classification Search .................. 347/47, 347/233–235, 238–240, 242, 255, 248–251; 358/489
    See application file for complete search history.

(56) References Cited

U.S. PATENT DOCUMENTS 4,745,487 A * 5/1988 Nishikawa .................. 358/489
5,668,588 A * 9/1997 Morizumi et al. .......... 347/242
6,624,877 B1 * 9/2003 Uemura et al. ............... 355/47

* cited by examiner

Primary Examiner—Hai Pham
(74) Attorney, Agent, or Firm—Sughrue Mion, PLLC

(57) ABSTRACT

The image recording method and image recording apparatus synchronize phase of a light deflector with rotation of a drum in response to the drum start point detection signal generated each time the drum rotates once, expose the two-dimensional image of one frame formed by a group of light sources disposed two-dimensionally onto the recording medium while causing the image at rest on the recording medium relatively thereto, thereafter move the optical system in the auxiliary scanning direction by an integral multiple of a pixel pitch forming one frame as well as deflect an angle of the light deflector in the main scanning direction by one frame so as to expose the next frame and on for one rotation of the drum. When the position is dislocated in the auxiliary scanning direction at the time the recording medium is to be exposed in a subsequent one rotation of the drum, the method and apparatus correct the dislocation of the position in the auxiliary scanning direction by changing an auxiliary scanning movement speed in a non-exposure time zone between the previous and subsequent rotations of the drum.

Accordingly, the method and apparatus can prevent the occurrence of streaked unevenness in the surface exposure and spiral exposure.

4 Claims, 8 Drawing Sheets to the MMA $94$.

IMAGE RECORDING METHOD AND IMAGE RECORDING APPARATUS

BACKGROUND OF THE INVENTION

The present invention relates to the technical field of an image recording method and an image recording apparatus, and more particularly, to an image recording system using a light modulator of two-dimensional arrangement (two-dimensional spatial light modulator) such as a micro mirror array (hereinafter, referred to as "MMA") or a two-dimensional mirror array device.

Mainly used in a digital image exposing system utilized in various types of printers is a so-called laser beam scan exposure (raster scan) for two-dimensionally exposing a recording medium with a laser beam modulated in accordance with an image to be recorded by deflecting the laser beam in a main scanning direction while relatively moving the recording medium and an optical system in an auxiliary scanning direction perpendicular to a main scanning direction.

In contrast, recently, various types of digital image exposure systems have been proposed which use two-dimensional spatial optical modulators such as a liquid crystal display (hereinafter, referred to as "LCD") and the digital micromirror device™ (hereinafter, referred to as "DMD") that are utilized as a display unit in a display, a monitor and the like. In the exposure systems, a recording medium is basically exposed by forming an image displayed by the two-dimensional spatial optical modulator on the recording medium.

In particular, the MMA is advantageous in exposure at high speed because the MMA has a modulation speed (response speed) faster than that of the LCD and moreover utilizes light more effectively than the LCD.

A so-called outer drum type image recording apparatus is known as an image recording apparatus using the two-dimensional spatial optical modulator. As shown in FIG. 8, for example, the outer drum type image reading apparatus is arranged such that an image formed by the two-dimensional spatial optical modulator (MMA) 94 is exposed on a recording medium 92 wound around the outer surface of a rotary drum 90 so as to record an image.

In the image recording apparatus, light from a light source (not shown) is reflected by the MMA 94, and the image carried by the reflected light (the image within the range that can be recorded by the MMA 94 at a time, which is referred to as the image of one frame) is formed on the recording medium 92 through an imaging lens 96, thereby the image 98 of the one frame is recorded.

The MMA 94 is composed of minute mirrors (micromirrors) disposed two-dimensionally in longitudinal and lateral directions in a rectangular shape, wherein each micromirror corresponds to one pixel, and the image of the one frame described here is composed of the number of pixels as many as the number of the micro-mirrors constituting the MMA.

At this time, the rotary drum 90 rotates in the direction shown by an arrow T in the figure at a constant speed and the recording medium 92 is also rotated in the same direction as that of the rotary drum 90. Thus, the image 98 of the one frame is sequentially recorded on the recording medium 92 from a lower side to an upper side as shown by an arrow M in the figure. The direction M is referred to as a main scanning direction in image recording.

An optical system composed of the MMA 94, the imaging lens 96, and the like is placed on an auxiliary scanning/transportation unit 100 and moved at a predetermined speed in the direction shown by an arrow S that is approximately perpendicular to the (above-mentioned) main scanning direction M. The direction S is referred to as an auxiliary scanning direction.

In the illustrated image recording apparatus, images are recorded on the recording medium 92 by a so-called spiral exposure system as shown by slanted lines in the figure by moving the optical system in the auxiliary scanning direction S in synchronism with the rotation of the rotary drum 90 and by controlling image data to be supplied to the MMA 94.

However, in the image recording system for executing spiral exposure while carrying out areal exposure (exposure of the image of the frame) using the conventional two-dimensional spatial optical modulator described above, frames cannot be aligned with each other when the circumferential length of the drum is not an integral multiple of the size of an image recorded on one frame in the main scanning direction. Accordingly, when images have been recorded by rotating the drum once and then images begin to be recorded in a subsequent one rotation of the drum, the image of one frame recorded in the subsequent one rotation of the drum cannot be located exactly adjacent to the image of one frame recorded in the previous one rotation of the drum, that is, the frame of the former image overlaps the frame of the latter image or a gap is formed therebetween, on the contrary, thereby a problem arises in that streaked unevenness is produced in the main scanning direction.

SUMMARY OF THE INVENTION

An object of the present invention, which was made in view of the above problem, is to provide an image recording method and an image recording apparatus capable of preventing the occurrence of streaked unevenness in a spiral exposure system for executing areal exposure using a group of light sources disposed two-dimensionally even if location of a position is caused in the auxiliary direction between the image of one frame formed in the exposure executed in a previous one rotation of a drum and the image of one frame formed in the exposure executed in a subsequent one rotation thereof because the circumferential length of the drum is not an integral multiple of the size an image recorded on one frame in a main scanning direction in the images formed by the group of the light sources.

In order to attain the object described above, the first aspect of the present invention provides an image recording method of recording a two-dimensional image formed by a group of light sources disposed two-dimensionally on a recording medium wound around an outer surface of a drum rotating at a constant speed by exposing the recording medium by main scanning it with an optical system having a light deflector in a main scanning direction opposite to the rotating direction of the drum as well as moving the optical system in an auxiliary scanning direction approximately perpendicular to the main scanning direction, comprising the steps of generating a drum start point detection signal each time the drum rotates once, synchronizing phase of the light deflector with rotation of the drum in response to the drum start point detection signal, and exposing the two-dimensional image of one frame formed by the group of light sources disposed two-dimensionally onto the recording medium while causing the image at rest on the recording medium relatively thereto, moving the optical system, after the one frame has been exposed, in the auxiliary scanning direction by an integral multiple of a pixel pitch forming the one frame as well as exposing a next frame by deflecting an angle of the light deflector in the main scanning direction by one frame, and correcting, when position at which the two-dimensional image of the one frame is to be recorded is dislocated in the auxiliary scanning direction at the time the recording medium is exposed in a subsequent one rotation of the drum after the recording medium has been exposed in one rotation of the drum, the position dislocated in the auxiliary scanning direction by changing an auxiliary scanning movement speed in a non-exposure time zone from completion of exposure of the recording medium in the one rotation of the drum to beginning of exposure of the recording medium in the subsequent one rotation of the drum.

And similarly, in order to attain the object described above, the second aspect of the present invention provides an image recording method of recording a two-dimensional image formed by a group of light sources disposed two-dimensionally on a recording medium wound around an outer surface of a drum rotating at a constant speed by exposing the recording medium by main scanning it with an optical system having a light deflector in a main scanning direction opposite to a rotating direction of the drum as well as moving the optical system in an auxiliary scanning direction approximately perpendicular to the main scanning direction, comprising the steps of generating a drum start point detection signal each time the drum rotates once, synchronizing phase of the light deflector with rotation of the drum in response to the drum start point detection signal, and exposing the two-dimensional image of one frame formed by the group of light sources disposed two-dimensionally onto the recording medium while causing the image at rest on the recording medium relatively thereto, moving the optical system, after the one frame has been exposed, in the auxiliary scanning direction by an integral multiple of a pixel pitch forming the one frame as well as exposing a next frame by deflecting an angle of the light deflector in the main scanning direction by one frame, and correcting, when position at which the two-dimensional image of the one frame is to be recorded is dislocated in the auxiliary scanning direction at the time the recording medium is exposed in a subsequent one rotation of the drum after the recording medium has been exposed in one rotation of the drum, the position dislocated in the auxiliary scanning direction by electrically shifting image data to be supplied to the group of light sources disposed two-dimensionally for each pixel.

Further similarly, in order to attain the same object, the third aspect of the present invention provides an image recording method of recording a two-dimensional image formed by a group of light sources disposed two-dimensionally on a recording medium wound around an outer surface of a drum rotating at a constant speed by exposing the recording medium by main scanning it with an optical system having a light deflector in a main scanning direction opposite to a rotating direction of the drum as well as moving the optical system in an auxiliary scanning direction approximately perpendicular to the main scanning direction, comprising the steps of generating a drum start point detection signal each time the drum rotates once, synchronizing phase of the light deflector with rotation of the drum in response to the drum start point detection signal, and exposing the two-dimensional image of one frame formed by the group of light sources disposed two-dimensionally onto the recording medium while causing the image at rest on the recording medium relatively thereto, moving the optical system, after the one frame has been exposed, in the auxiliary scanning direction by an integral multiple of a pixel pitch forming the one frame as well as exposing a next frame by deflecting an angle of the light deflector in the main scanning direction by one frame, and correcting, when position at which the two-dimensional image of the one frame is to be recorded is dislocated in the auxiliary scanning direction at the time the recording medium is exposed in a subsequent one rotation of the drum after the recording medium has been exposed in one rotation of the drum, the position dislocated in the auxiliary scanning direction by electrically shifting image data to be supplied to the group of light sources disposed two-dimensionally for each pixel when dislocation of the position in the auxiliary scanning direction is an integral multiple of the pixel pitch of the one frame as well as correcting the position dislocated in the auxiliary scanning direction by changing an auxiliary scanning movement speed in a non-exposure time zone from completion of exposure of the recording medium in the one rotation of the drum to beginning of exposure of the recording medium in the subsequent one rotation of the drum when the dislocation of the position in the auxiliary scanning direction is not an integral multiple of the pixel pitch of the one frame.

Additionally, in order to attain the same object, the fourth aspect of the present invention provides an image recording apparatus for recording a two-dimensional image formed by a group of light sources disposed two-dimensionally on a recording medium wound around an outer surface of a drum rotating at a constant speed by exposing the recording medium by main scanning it with an optical system having a light deflector in a main scanning direction opposite to a rotating direction of the drum as well as moving the optical system in an auxiliary scanning direction approximately perpendicular to the main scanning direction, comprising a drum start point detector for generating a drum start point detection signal each time the drum rotates once, optical deflector angle control means for synchronizing phase of the light deflector with rotation of the drum in response to the drum start point detection signal to expose the two-dimensional image of one frame formed by the group of light sources disposed two-dimensionally onto the recording medium while causing the image at rest on the recording medium relatively thereto, auxiliary scanning transportation means for moving the optical system in the auxiliary scanning direction by an integral multiple of a pixel pitch forming the one frame after the one frame has been exposed, means for detecting dislocation of position at which the two-dimensional image of the one frame is to be exposed when the recording medium is exposed in a subsequent one rotation of the drum after the recording medium has been exposed in one rotation of the drum; and further at least one of image signal control means for electrically shifting image data to be supplied to the group of light sources disposed two-dimensionally for each pixel when the dislocation of the position is an integral multiple of the pixel pitch of the one frame and auxiliary scanning speed change means for controlling the auxiliary scanning transportation means so as to change a auxiliary scanning speed in a non-exposure time zone from completion of exposure of the recording medium in the one rotation of the drum to beginning of exposure of the recording medium in the subsequent one rotation of the drum to thereby correct the dislocation of the position in the auxiliary scanning direction.

DETAILED DESCRIPTION OF THE INVENTION

An image recording method and an image recording apparatus according to the present invention will be described below in detail based on a preferable embodiment shown in the accompanying drawings.

Figure 1:
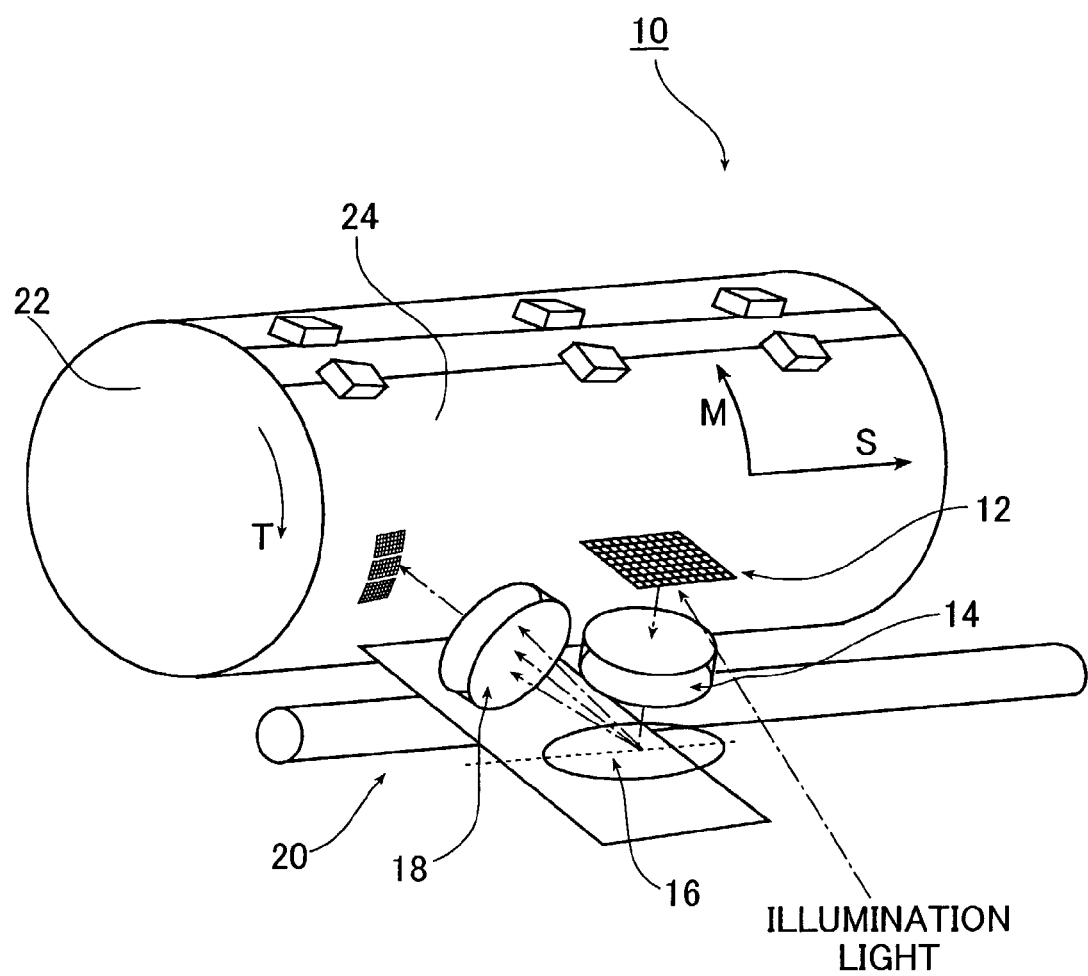
FIG. 1 is a perspective view showing the schematic arrangement of an image recording apparatus according to the present invention.

FIG. 1 is a perspective view showing the schematic arrangement of an embodiment of the image recording apparatus according to the present invention.

The illustrated image recording apparatus 10 is an apparatus for recording an image by two-dimensionally scan-exposing a recording medium using an array of reflecting light spots (elements), as a group of light sources disposed two-dimensionally, produced in a two-dimensional spatial light modulator (2DSLM) such as a micro mirror array (hereinafter, referred to as "MMA") or a two-dimensional mirror array device (2DMAD) as so-called Digital Micromirror Device™ (DMD) by illumination with an illumination light flux and a so-called external drum external surface drum.

In FIG. 1, the image recording apparatus 10 includes a light source (not shown), an MMA 12 for receiving illumination light emitted from the light source, a collimator lens (light collimator) 14, a light deflector 16, a focusing (or imaging) lens 18, an auxiliary scanning drive system 20, and an external drum (outer drum) 22 (hereinafter simply referred to as "drum" 22). Further, the drum 22 has a recording medium 24 wound around the outer surface thereof.

While not shown, various types of light sources, for example, so-called large or broad area light sources can be used in accordance with the spectral sensitivity of the recording medium used as long as they can emit a sufficient quantity of light. For example, an ultra-high pressure mercury lamp, a metal halide lamp, and the like may be used as the light source when a plate-making film and a conventional PS plate, which are sensible to visible light and ultraviolet light, are used as the recording medium.

Further, an infrared broad area laser diode, and the like may be used in the case of a heat mode plate which is sensitive to infrared light. In addition to the above, an LED, a halogen lamp, a xenon lamp, and the like may also be used in accordance with the recording medium used.

The MMA 12 is a two-dimensional spatial light modulator in which rectangular micromirrors capable of rotating (swinging) by a predetermined angle about a predetermined rotational axis are two-dimensionally disposed. The electrostatic rotation of the micromirrors modulates light by activating and deactivating each micromirror (=pixel) for exposure. The MMA 12 is formed on a silicon chip by a micromachine technology making use of a process for manufacturing a semiconductor device.

The MMA 12 used in the image recording apparatus 10 of the illustrated example has 1280 pixels×1024 pixels with intervals therebetween set to 17 μm. Here, an image composed of 1280 pixels×1024 pixels and recorded by the MMA 12 at a time is referred to as one frame. Further, respective components are disposed such that the rotational direction (shown by an arrow T in FIG. 1) of the drum 22 to be described later can optically agree with the direction of the pixel train of the 1024 pixels of the MMA 12 and that the axial direction of the drum 22 can optically agree with the direction of the pixel train of the 1280 pixels of the MMA 12. The direction in which images are recorded by the MMA 12 on the recording medium frame by frame as the drum 22 rotates is referred to as a main scanning direction. As shown by an arrow M in FIG. 1, the main scanning direction is a direction opposite to the rotational direction T of the drum 22. Further, a direction shown by an arrow S in the figure that is the same as the axial direction of the drum 22 and perpendicular to a main scanning direction M is referred to as an auxiliary scanning direction.

Note that the spatial light modulator of the two dimensional arrangement used in the present invention is not limited to the MMA 12 of the illustrated example, and various types of modulators such as a liquid crystal type, PLZT type, EO (electrooptical) type and AO (acoustooptic) type can be used. However, the MMA is most preferable among them from the view point of a modulation speed, an efficiency for light utilization, and the like.

Further, a surface emitting laser or an LED array, in which light emission points are disposed two-dimensionally, can be used as a two-dimensional array-like light source.

The collimator lens 14 is used to allow the light reflected by the MMA 12 to be incident on the light deflector 16 as collimated light.

The light deflector 16 deflects the light incident through the collimator lens 14 in the main scanning direction M in synchronism with the rotation of the drum 22. That is, the light deflector 16 is driven by a drive unit (light deflector angle control circuit) not shown in FIG. 1 and deflects the direction of light in a direction opposite to the main scanning direction M in synchronism with the rotation of the drum 22 so that even if the drum 22 rotates, the image data of one frame is formed at the same position of the recording medium 24.

Preferred examples of the light deflector 16 include a galvano-scanner (galvano-meter mirror), a polygonal mirror, a piezo system, and devices for shifting lenses (including also the ones for shifting the collimator lens 14 and the focusing lens 18).

Further, the focusing lens 18 images the light deflected by the light deflector 16 at a predetermined position on the recording medium 24 wound around the drum 22.

The light deflected by the MMA 12 is finally imaged on the surface of the recording medium 24 held on the surface of the drum 22. Examples of the recording medium 24 include a light mode sensitive material and a heat mode sensitive material. Further, the recording medium is not particularly limited and may be a film or a plate.

The drum 22 is a cylinder which holds the recording medium 24 on the outside surface thereof and rotates in the direction shown by the arrow T in FIG. 1 around an axis.

An optical system including the light source, the MMA 12, the collimator lens 14, the light deflector 16, and the focusing lens 18 is integrated together as a unit and moved by an auxiliary scanning drive system 20 at a predetermined speed in the auxiliary scanning direction (the direction shown by the arrow S in FIG. 1).

Figure 2:
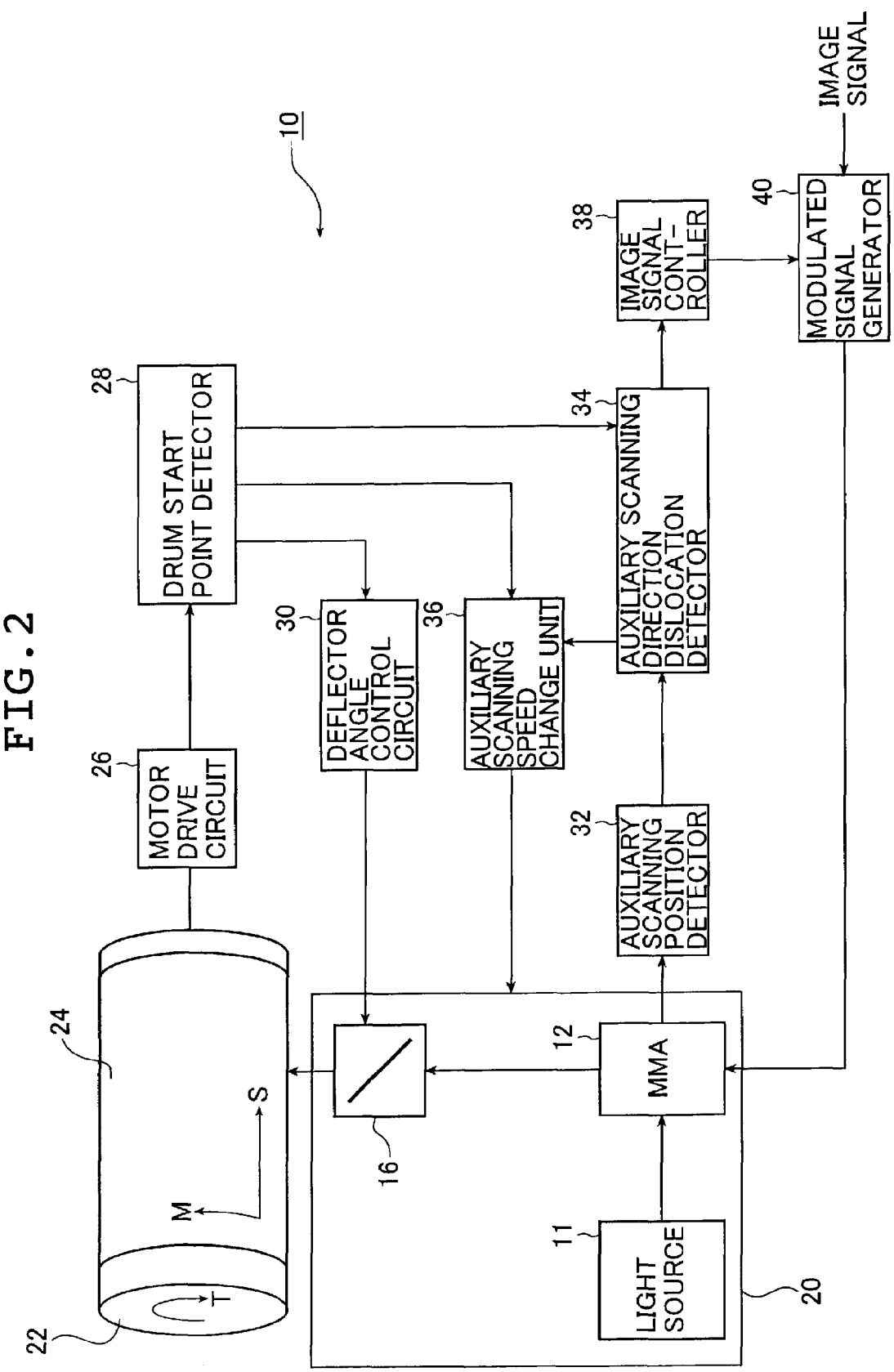
FIG. 2 is a block diagram showing the outline of a recording timing control system of the image recording apparatus shown in FIG. 1.

FIG. 2 shows a block diagram of the control system of recording timing of the image recording apparatus 10 according to the embodiment under consideration.

FIG. 2 shows a control system which controls the various components and is added to the arrangement shown in FIG. 1.

In FIG. 2, the optical system including the light source 11, the MMA 12, the light deflector 16 and the like (the collimator lens 14 and the focusing (or imaging) lens 18 are not-shown in FIG. 2) is integrated together on the auxiliary scanning drive system (auxiliary scanning transportation unit) 20 and can move at a predetermined speed in the auxiliary scanning direction S.

While the light deflector 16 deflects the light reflected by the MMA 12 in the main scanning direction in synchronism with the rotation of the drum 22 as described above, a drum start point detector 28 is disposed to the motor drive circuit 26 of the drum 22 to control the timing of the deflection. The drum start point detector 28 issues a drum start point detection signal each time the drum 22 rotates once. A rotary encoder, for example, which detects a rotational position of the drum 22 can be used as the drum start point detector 28.

A deflector angle control circuit 30 is disposed to control the light deflector 16 and starts the light deflector 16 by sending a signal thereto in response to a drum start point detection signal from the drum start point detector 28.

An auxiliary scanning position detector 32 is disposed to the auxiliary scanning drive system 20 to detect an auxiliary scanning position. An auxiliary scanning position signal detected is supplied to an auxiliary scanning direction dislocation detector 34. The auxiliary scanning direction dislocation detector 34 detects the dislocation (displacement) of the position of an image recording position in the auxiliary scanning direction from the auxiliary scanning position signal and the drum start point detection signal.

When the drum has been exposed for one rotation thereof and then begins to be exposed for a subsequent one rotation thereof, the initial frame in the subsequent one rotation of the drum must be exposed at a position exactly next to the initial frame in the previous one rotation thereof. However, when images are recorded at an auxiliary scanning speed set constant, the initial frame in the subsequent one rotation of the drum is not located at the position where it is to be intrinsically exposed, and a gap may be formed between the initial frames in the previous and subsequent rotations of the drum or the initial frame in the previous rotation of the drum may overlap the initial frame in the subsequent rotation of the drum. In these circumstances, the dislocation of the position of the image recording position in the auxiliary scanning direction means the dislocation of the position between both the initial frames in the auxiliary scanning direction.

It is ideal that the image can be recorded continuously at a constant auxiliary scanning speed at all times without the occurrence of dislocation of the position. However, due to the circumferential length of the drum, the size of the recording medium and the like, the above dislocation of the position may occur when the length of the unexposed region between both ends of the recording medium wound around the drum is not an integral multiple of the size of one frame recorded by the MMA in the main scanning direction. This will be described in detail later.

Two units are provided to correct the dislocation of the position in the auxiliary scanning direction when the occurrence thereof is detected.

One of the units is an auxiliary scanning speed change unit 36 and the other of them is an image signal controller 38. When the occurrence of dislocation of the position in the auxiliary scanning direction is detected, the auxiliary scanning speed change unit 36 corrects the dislocation of the position in the auxiliary scanning direction by changing the auxiliary scanning speed by controlling the auxiliary scanning drive system 20 in the non-exposure time zone from the completion of exposure in one rotation of the drum to the beginning of exposure in a subsequent one rotation of the drum. Further, when the occurrence of dislocation of the position in the auxiliary scanning direction is detected, the image signal controller 38 sends a signal to a modulated signal generator 40 and corrects the dislocation of the position in the auxiliary scanning direction by displacing image data to be sent to the MMA 12 by electrically shifting the image data for each pixel.

Note that the modulated signal generator 40 ordinarily modulates an image signal in accordance with an auxiliary scanning position and the angular control of the light deflector 16 and sends the modulated image signal to the MMA 12.

The operation of this embodiment will be specifically described below with reference to FIGS. 3 to 7.

Figure 3:
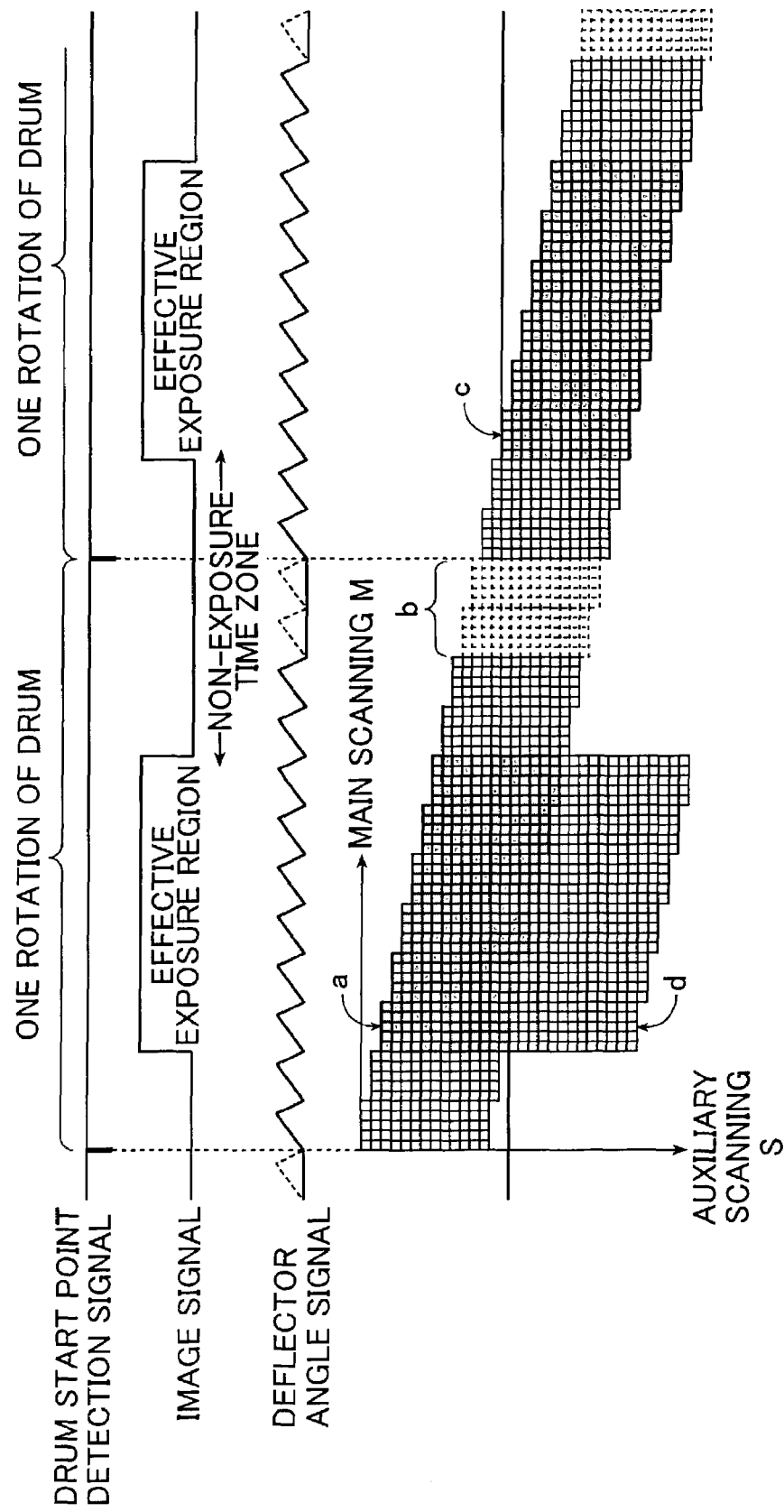
FIG. 3 is a view explaining respective signals and exposure of respective frames when images are ordinarily exposed.

FIG. 3 is a view explaining respective signals and exposure of respective frames when images are ordinarily exposed.

The drum start point detector 28 generates a drum start point detection signal each time the drum 22 rotates once. That is, in FIG. 3, the drum 22 rotates once from the time at which the uppermost drum start point detection signal is generated as shown in the figure to the time at which a next drum start point detection signal is generated.

When the drum start point detection signal is generated, the deflector angle control circuit 30 generates a deflector angle signal, and the light deflector 16 is driven in response to the signal.

When the light deflector 16 is driven the predetermined number of times (twice in FIG. 2), an image signal modulated by the modulated signal generator 40 is sent to the MMA 12, and images (of six frames in the figure) are recorded on the recording medium 24 in the effective exposure region in the one rotation of the drum 22. It cannot be said that the images exposed to the effective exposure region of the drum 22 when it rotates once are always composed of the exact integer number of frames due to the circumferential length of the drum 22, the sizes of the recording medium 24 and the MMA 12, and the like. At this time, after an initial frame a has been exposed, the optical system is moved by an integral multiple of a pixel pitch (one pixel in the figure) in the auxiliary scanning direction, and then a subsequent frame is exposed, and the images are recorded in the one rotation of the drum 22 in this manner similarly.

In the example shown in FIG. 3, the non-exposure time zone from the completion of exposure in one rotation of the drum 22 to a subsequent effective exposure region includes 6 frames. Thus, when the optical system is moved in the auxiliary scanning direction at a constant speed (a speed at which the optical system is moved for one pixel each time one frame is exposed), the initial frame c of the drum 22 in the subsequent one rotation thereof is recorded at a position d located exactly next to the initial frame a in the previous one rotation of the drum 22, thereby the images can be continuously recorded without the occurrence of dislocation of the position in the auxiliary scanning direction.

Further, the light deflector 16 is stopped once in the non-image region b, in which the recording medium 24 does not exist, between both ends of the recording medium 24 wound around the drum 22, and then the light deflector 16 is started again in response to a next drum start point detection signal.

Next, a case, in which dislocation of the position occurs in the auxiliary scanning direction and must be corrected, will be described.

Figure 4:
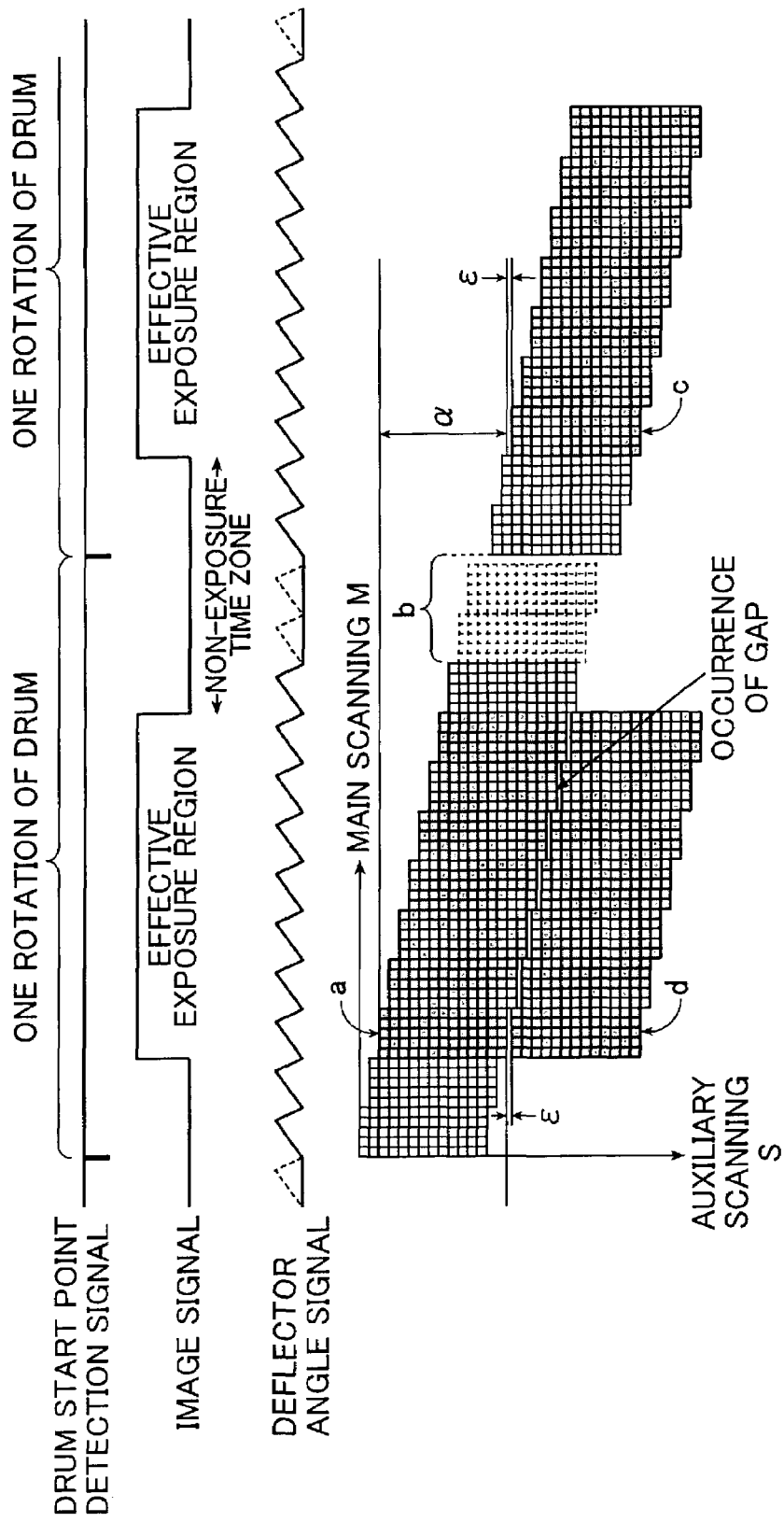
FIG. 4 is a view explaining respective signals and exposure of respective frames in a case in which dislocation of the position is caused in an auxiliary scanning direction and must be corrected.

FIG. 4 shows respective signals and exposure of respective frames. Basically, the relationship among the respective signals are the same as that described in FIG. 3. In FIG. 4, however, the length of the non-image region b in the main scanning direction, in which the recording medium 24 does not exist, between both ends of the recording medium 24 is somewhat increased due to the circumferential length of the drum 22, the size of the recording medium 24, and the like. At this time, when the optical system is moved in the auxiliary scanning direction at the constant auxiliary scanning speed, the exposure position of the initial frame c in the subsequent one rotation of the drum 22, which must be intrinsically located at the position displaced exactly for one frame α from the initial frame a having been exposed in the previous one rotation of the drum 22, is further dislocated for a gap ε in the auxiliary scanning direction. Accordingly, if the drum 22 is continuously exposed in the subsequent one rotation thereof in this state, the gap ε is made between the position d at which the initial frame c is to be exposed in the exposure of this time and the initial frame a in the previous one rotation of the drum 22. The gaps ε are made in all the subsequent frames, thereby streaked unevenness is produced by the gaps in the main scanning direction.

Figure 5:
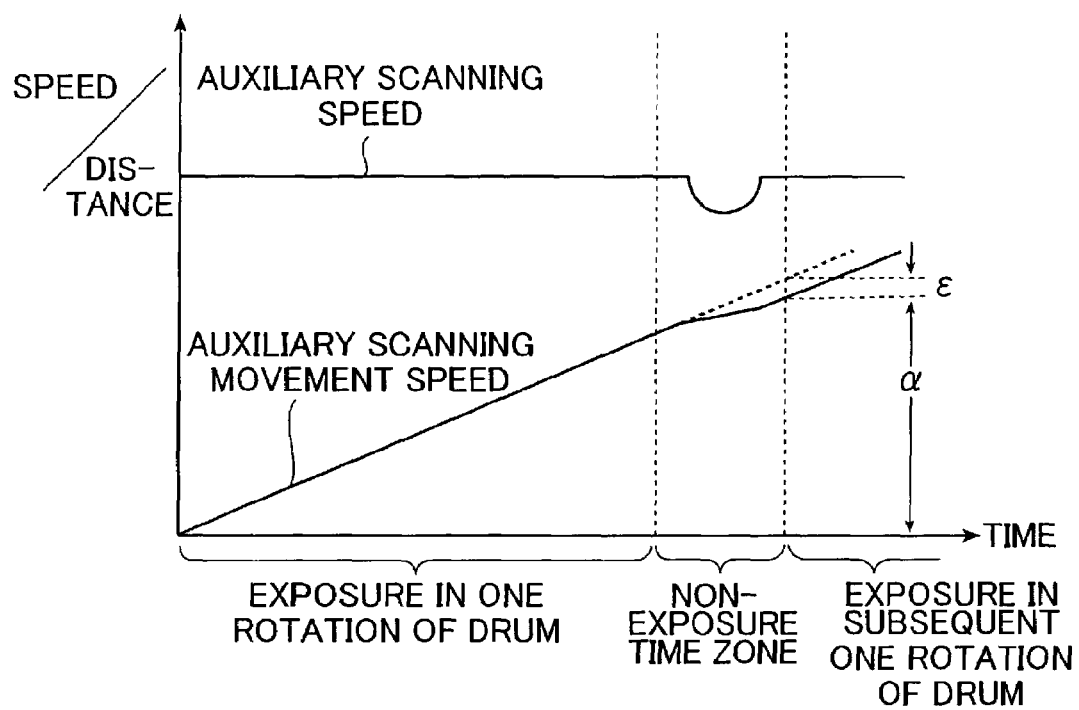
FIG. 5 is a graph showing the relationship between an auxiliary scanning speed and an auxiliary scanning movement distance.

To cope with this problem, the auxiliary scanning speed is reduced in the non-exposure time zone after the completion of exposure in the one rotation of the drum 22 as shown in FIG. 5 such that the dislocation of the position ε in the auxiliary scanning direction, which is occurred when the auxiliary scanning speed is set constant, is corrected by displacing the initial frame c from the initial frame a having been exposed in the previous one rotation of the drum 22 by exactly one frame α at the beginning of exposure in the subsequent one rotation of the drum 22. It is needless to say that when the exposure is executed in the subsequent one rotation of the drum 22, the auxiliary scanning speed is set to the same speed as that used in the exposure in the previous one rotation of the drum 22.

The process for correcting the dislocation of the position in the auxiliary scanning direction is executed in such a manner that the auxiliary scanning direction dislocation detector 34 detects the dislocation of the position in the auxiliary scanning direction from the drum start point detection signal and the auxiliary scanning position and sends a signal to the auxiliary scanning speed change unit 36 to thereby control the auxiliary scanning drive system 20 in the non-exposure time zone.

Figure 6:
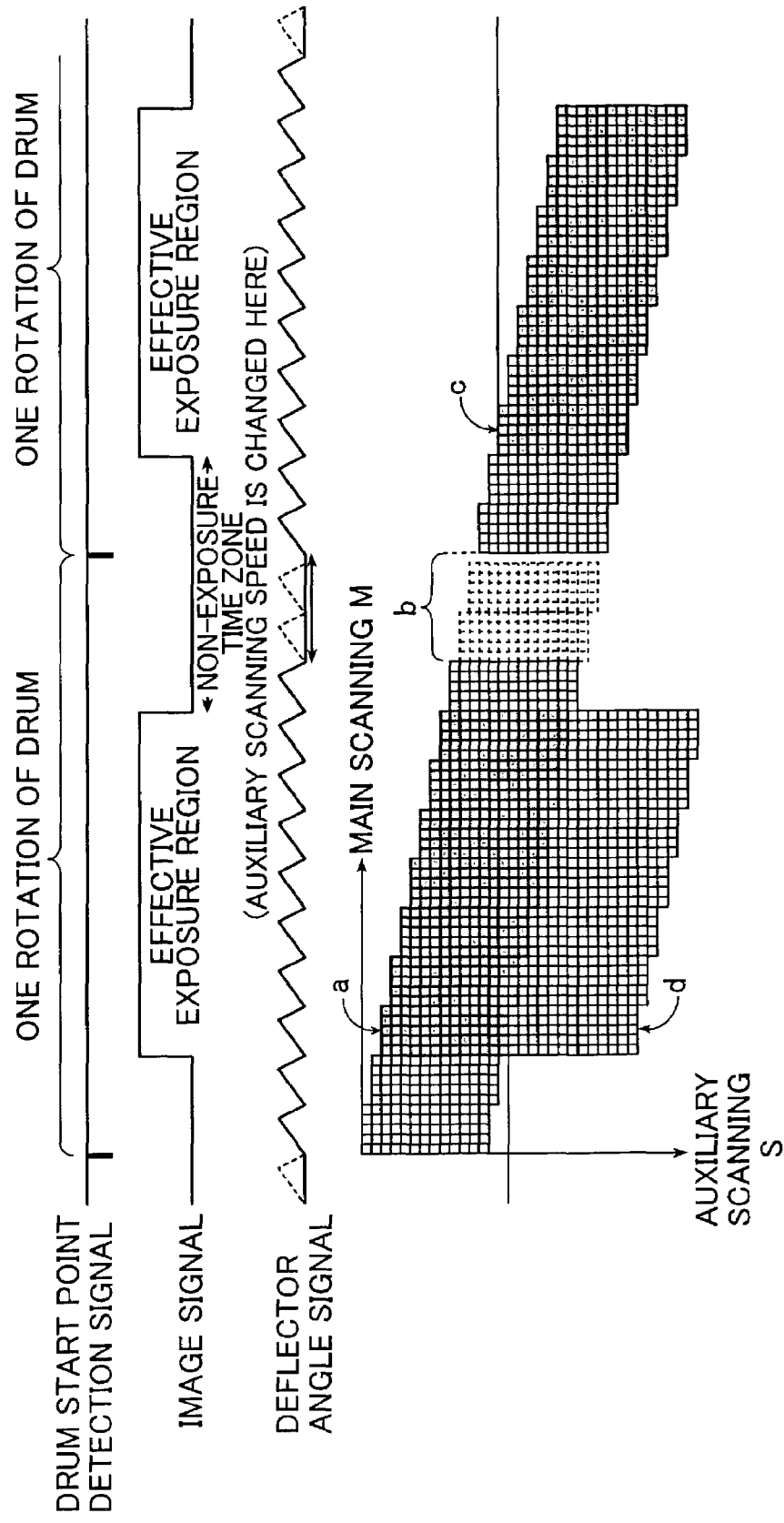
FIG. 6 is a view explaining respective signals and exposure of respective frames in a case in which dislocation of the position in the auxiliary scanning direction is corrected by changing the auxiliary scanning speed.

FIG. 6 shows images exposed in the correction process.

As shown in FIG. 6, the dislocation of the position in the auxiliary scanning direction is corrected by reducing the auxiliary scanning speed in the non-exposure time zone (distance slightly longer than five frames in the figure) after the images (seven frames in the figure) have been exposed in the effective exposure region in the one rotation of the drum 22, thereby the initial frame c in the effective exposure region in the subsequent one rotation of the drum 22 can be exactly aligned with the position d located exactly next to the initial frame a having been exposed in the previous one rotation of the drum 22.

Further, also in this case, the light deflector 16 is stopped once in the non-image region b, in which the recording medium 24 does not exist, between both the ends of the recording medium 24 wound around the drum 22, and then the light deflector 16 is started again in response to a next drum start point detection signal. In this case, it is necessary to stop the light deflector 16 once and to start it again in response to the next drum start point detection signal because the length of the non-image region b is not an integral multiple of one frame.

Note that the dislocation of the position in the auxiliary scanning direction is arisen also in the case that the distance in the non-exposure time zone is short or the auxiliary scanning speed is slow, and thus the frame having been exposed in the previous one rotation of the drum 22 overlaps the frame exposed in the subsequent one rotation thereof when the above state is maintained as it is, contrary to the case that the distance in the non-exposure time zone is long or the auxiliary scanning speed is fast, thus a gap is made between the frame having been exposed in the previous one rotation of the drum 22 and the frame exposed in the subsequent one rotation thereof when the above state is maintained as it is, and streaked unevenness is produced thereby in the main scanning direction.

In this case, the dislocation of the position in the auxiliary scanning direction may be corrected by changing the auxiliary scanning speed to increase it in the non-exposure time zone.

The method of correcting the dislocation of the position in the auxiliary scanning direction that is caused when the frame having been exposed in the previous one rotation of the drum 22 overlaps the frame exposed in the subsequent one rotation thereof also includes a method of correcting the dislocation of the position by displacing image data by electrically shifting the pixels of the image data to be sent to the MMA 12 when the dislocation of the position in the auxiliary scanning direction is an exact integral multiple of the pitch of pixels constituting one frame, in addition to the method of correcting the dislocation of the position by changing the auxiliary scanning speed as described above.

The method of correcting the dislocation of the position in the auxiliary scanning direction by electrically shifting the pixels will be described below.

Figure 7:
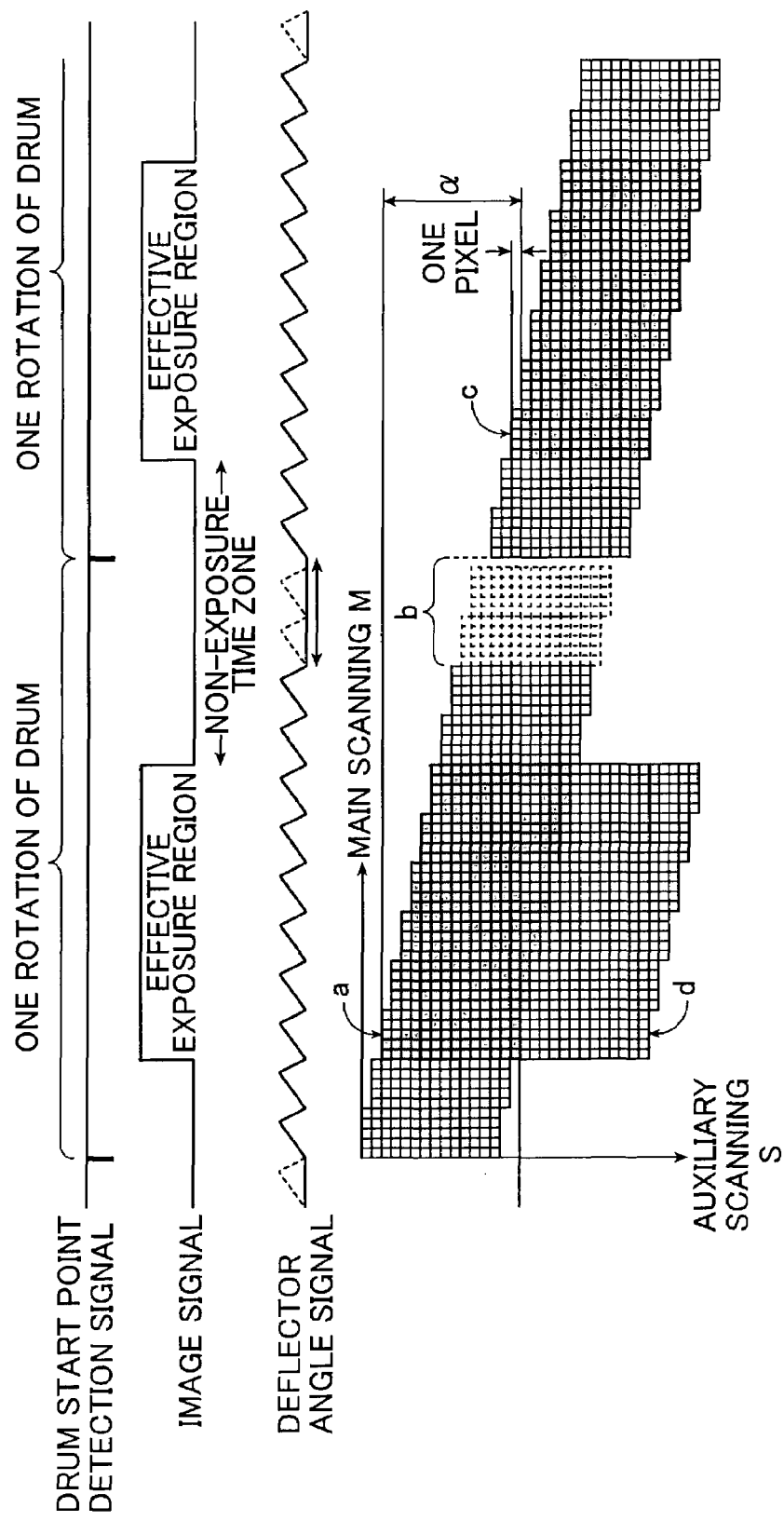
FIG. 7 is a view explaining respective signals and exposure of respective frames in a case in which dislocation of the position in the auxiliary scanning direction is corrected by shifting pixels.
Figure 8:
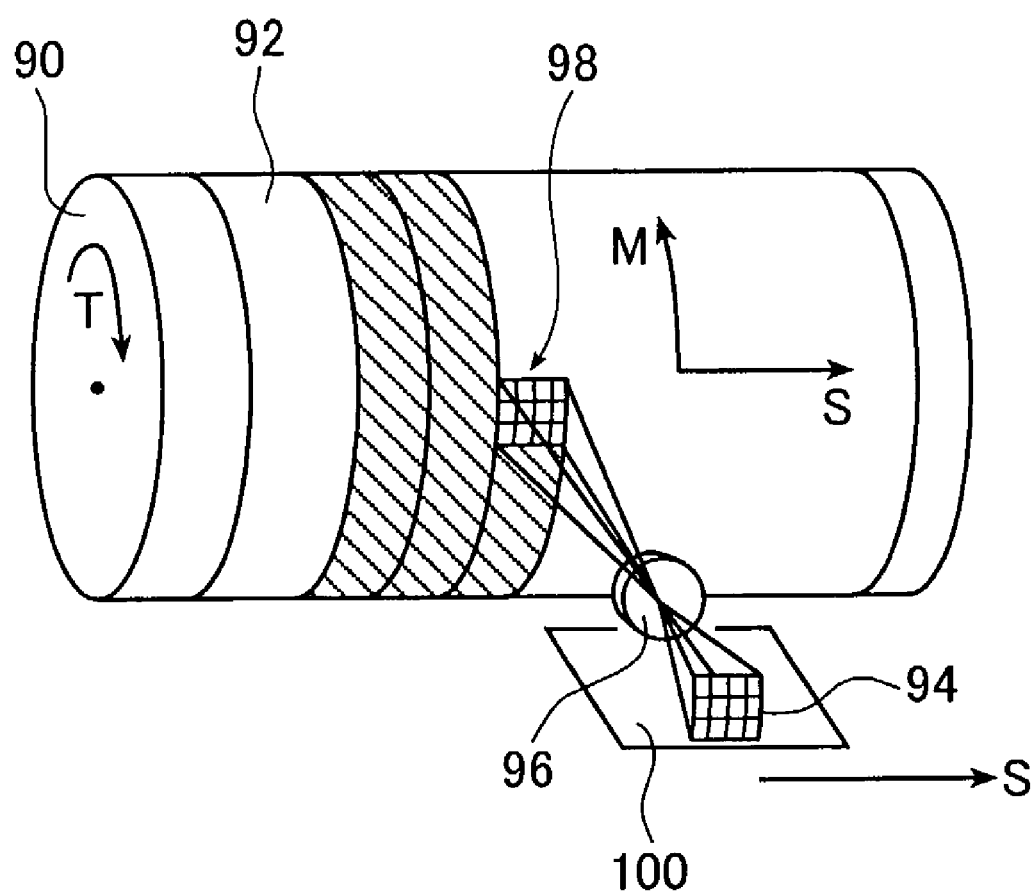
FIG. 8 is a perspective view showing an image recording method executed using a conventional image recording apparatus.

FIG. 7 shows the relationship between respective signals and exposure of frames. A non-image region is not an integral multiple of the frame also in this case, similarly to FIG. 6. Further, in this case, the initial frame c exposed in a subsequent one rotation of the drum 22 cannot be moved by the length a of one frame from the initial frame a having been exposed in a previous one rotation of the drum 22 in spite of that it must be moved exactly by the length α. Accordingly, the initial frame c is dislocated leftward (that is, upward in the figure) of the auxiliary scanning direction by an integral multiple of the pixel pitch of one frame (exactly one pixel in this case), thereby one pixel column overlaps the previous frame a in the main scanning direction as shown by the frames a and d in the figure.

Accordingly, the four pixels, which are arranged in the main scanning direction on the leftmost side (uppermost side in the figure) of the initial frame c (in the auxiliary scanning direction) exposed in the subsequent one rotation of the drum 22, have been exposed as the four pixels arranged in the main scanning direction on the rightmost side (lowermost side in the figure) of the initial frame a (in the auxiliary scanning direction) having been exposed in the previous one rotation of the drum 22. Thus, when the four pixels are exposed in the subsequent one rotation of the drum 22 in this state, they are exposed twice on the rightmost side of the frame a and on the leftmost side of the frame d. As a result, streaked unevenness is produced in the main scanning direction.

To cope with this problem, in this case, the dislocation of the position in the auxiliary scanning direction is corrected by controlling the modulated signal generator 40 by sending a signal from auxiliary scanning direction dislocation detector 34 to the image signal controller 38 to thereby electrically shift the pixels.

That is, no image data is sent to the four pixels on the leftmost side (on the uppermost side in the figure) in the auxiliary scanning direction as to the initial frame c exposed in the subsequent one rotation of the drum 22 in FIG. 7 as shown by voided pixels in the figure so that the four pixels are not exposed in the subsequent one rotation of the drum 22, thereby the double exposure of the four pixels can be avoided. Further, all the subsequent frames are processed similarly so that they are not exposed doubly. With this operation, the occurrence of streaked unevenness in the main scanning direction can be prevented.

Note that, also in the case of FIG. 7, the light deflector 16 is stopped once in the non-image region b, in which the recording medium 24 does not exist, between both the ends of the recording medium 24 wound around the drum 22, and then the light deflector 16 is started again in response to a next drum start point detection signal.

As described above, when the position of a frame in the exposure in the subsequent one rotation of the drum 22 is dislocated to the left side of the auxiliary scanning direction by an integral multiple of the pixel pitch from the position where the frame must be intrinsically located, the dislocation of the position in the auxiliary scanning direction can be corrected by electrically shifting the pixels as described above. Further, when the dislocation of the position is corrected by electrically shifting the pixels, a speed variation load applied to the motor of the auxiliary scanning drive system 20 can be reduced because it is not necessary to change the auxiliary scanning speed.

When, however, the dislocation of the position is not the integral multiple of the pixel pitch such as one half a pixel, and the like, the dislocation of the position cannot be corrected by shifting the pixels because it can be corrected by the pixel shift only in the unit of an integral multiple of pixels. In this case, the dislocation of the position can be corrected by changing the auxiliary scanning speed as described above. Accordingly, it is preferable to selectively use the respective correcting methods depending upon the amount of dislocation of the position in the auxiliary scanning direction.

Further, as a method of synchronizing the phase of the light deflector 16 with the rotation of the drum 22, the light deflector 16 may be started in response to a drum start point detection signal issued once each time the drum 22 rotates, then may be stopped once in the non-image region b after it is operated the predetermined number of times, and then may be started again in response to a next drum start point detection signal. In addition to the above method, the phase of the light deflector 16 may be synchronized by starting the light deflector 16 in response to a drum start point detection signal and by changing a scanning frequency in the non-image region b.

While the image recording apparatus and the image recording method of the present invention have been described above in detail, the present invention is by no means limited to the above example and it is needless to say that various improvements and modifications can be made within the range which does not depart from the gist of the present invention.

As described above, according to the present invention, in the follower scanning spiral exposure using the group of the light sources disposed two-dimensionally, it is possible to prevent the occurrence of streaked unevenness even if the image of one frame is dislocated in the auxiliary scanning direction in the exposure executed in a subsequent one rotation of the drum after the completion of exposure in one rotation of the drum because the circumferential length of the drum is not an integral multiple of the size of the image of one frame, which has been formed by the group of the light sources, in the main scanning direction.

What is claimed is:

1. An image recording method of recording a two-dimensional image formed by a group of light sources disposed two-dimensionally on a recording medium wound around an outer-surface of a drum rotating at a constant speed by exposing the recording medium by main scanning it with an optical system having a light deflector in a main scanning direction opposite to a rotating direction of the drum as well as moving the optical system in an auxiliary scanning direction approximately perpendicular to the main scanning direction, comprising the steps of:

generating a drum start point detection signal each time the drum rotates once, synchronizing phase of the light deflector with rotation of the drum in response to the drum start point detection signal, and exposing the two-dimensional image of one frame formed by the group of light sources disposed two-dimensionally onto the recording medium while causing the image at rest on the recording medium relatively thereto;

moving the optical system, after the one frame has been exposed, in the auxiliary scanning direction by an integral multiple of a pixel pitch forming the one frame as well as exposing a next frame by deflecting an angle of the light deflector in the main scanning direction by one frame; and correcting, when position at which the two-dimensional image of the one frame is to be recorded is dislocated in the auxiliary scanning direction at the time the recording medium is exposed in a subsequent one rotation of the drum after the recording medium has been exposed in one rotation of the drum, the position dislocated in the auxiliary scanning direction by changing an auxiliary scanning movement speed in a non-exposure time zone from completion of exposure of the recording medium in the one rotation of the drum to beginning of exposure of the recording medium in the subsequent one rotation of the drum.

2. An image recording method of recording a two-dimensional image formed by a group of light sources disposed two-dimensionally on a recording medium wound around an outer surface of a drum rotating at a constant speed by exposing the recording medium by main scanning it with an optical system having a light deflector in a main scanning direction opposite to a rotating direction of the drum as well as moving the optical system in an auxiliary scanning direction approximately perpendicular to the main scanning direction, comprising the steps of:

generating a drum start point detection signal each time the drum rotates once, synchronizing phase of the light deflector with rotation of the drum in response to the drum start point detection signal, and exposing the two-dimensional image of one frame formed by the group of light sources disposed two-dimensionally onto the recording medium while causing the image at rest on the recording medium relatively thereto;

moving the optical system, after the one frame has been exposed, in the auxiliary scanning direction by an integral multiple of a pixel pitch forming the one frame as well as exposing a next frame by deflecting an angle of the light deflector in the main scanning direction by one frame; and correcting, when position at which the two-dimensional image of the one frame is to be recorded is dislocated in the auxiliary scanning direction at the time the recording medium is exposed in a subsequent one rotation of the drum after the recording medium has been exposed in one rotation of the drum, the position dislocated in the auxiliary scanning direction by electrically shifting image data to be supplied to the group of light sources disposed two-dimensionally for each pixel.

3. An image recording method of recording a two-dimensional image formed by a group of light sources disposed two-dimensionally on a recording medium wound around an outer surface of a drum rotating at a constant speed by exposing the recording medium by main scanning it with an optical system having a light deflector in a main scanning direction opposite to a rotating direction of the drum as well as moving the optical system in an auxiliary scanning direction approximately perpendicular to the main scanning direction, comprising the steps of:

generating a drum start point detection signal each time the drum rotates once, synchronizing phase of the light deflector with rotation of the drum in response to the drum start point detection signal, and exposing the two-dimensional image of one frame formed by the group of light sources disposed two-dimensionally onto the recording medium while causing the image at rest on the recording medium relatively thereto;

moving the optical system, after the one frame has been exposed, in the auxiliary scanning direction by an integral multiple of a pixel pitch forming the one frame as well as exposing a next frame by deflecting an angle of the light deflector in the main scanning direction by one frame; and correcting, when position at which the two-dimensional image of the one frame is to be recorded is dislocated in the auxiliary scanning direction at the time the recording medium is exposed in a subsequent one rotation of the drum after the recording medium has been exposed in one rotation of the drum, the position dislocated in the auxiliary scanning direction by electrically shifting image data to be supplied to the group of light sources disposed two-dimensionally for each pixel when dislocation of the position in the auxiliary scanning direction is an integral multiple of the pixel pitch of the one frame as well as correcting the position dislocated in the auxiliary scanning direction by changing an auxiliary scanning movement speed in a non-exposure time zone from completion of exposure of the recording medium in the one rotation of the drum to beginning of exposure of the recording medium in the subsequent one rotation of the drum when dislocation of the position in the auxiliary scanning direction is not an integral multiple of the pixel pitch of the one frame.

4. An image recording apparatus for recording a two-dimensional image formed by a group of light sources disposed two-dimensionally on a recording medium wound around an outer surface of a drum rotating at a constant speed by exposing the recording medium by main scanning it with an optical system having a light deflector in a main scanning direction opposite to a rotating direction of the drum as well as moving the optical system in an auxiliary scanning direction approximately perpendicular to the main scanning direction, comprising:

a drum start point detector for generating a drum start point detection signal each time the drum rotates once;

optical deflector angle control means for synchronizing phase of the light deflector with rotation of the drum in response to the drum start point detection signal to expose the two-dimensional image of one frame formed by the group of light sources disposed two-dimensionally onto the recording medium while causing the image at rest on the recording medium relatively thereto;

auxiliary scanning transportation means for moving the optical system in the auxiliary scanning direction by an integral multiple of a pixel pitch forming the one frame after the one frame has been exposed;

means for detecting dislocation of position at which the two-dimensional image of the one frame is to be exposed when the recording medium is exposed in a subsequent one rotation of the drum after the recording medium has been exposed in one rotation of the drum; and further at least one of image signal control means for electrically shifting image data to be supplied to the group of light sources disposed two-dimensionally for each pixel when the dislocation of the position is an integral multiple of the pixel pitch of the one frame and auxiliary scanning speed change means for controlling the auxiliary scanning transportation means so as to change a auxiliary scanning speed in a non-exposure time zone from completion of exposure of the recording medium in the one rotation of the drum to beginning of exposure of the recording medium in the subsequent one rotation of the drum to thereby correct the dislocation of the position in the auxiliary scanning direction.

* * * * *